United States Patent
Takahashi

(10) Patent No.: US 7,114,962 B1
(45) Date of Patent: Oct. 3, 2006

(54) CIRCUIT UNIT DEVICE

(75) Inventor: Ryoji Takahashi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/385,709

(22) Filed: Mar. 22, 2006

(30) Foreign Application Priority Data

Mar. 25, 2005 (JP) .............................. 2005-088514

(51) Int. Cl.
*H01R 12/00* (2006.01)
(52) U.S. Cl. ..................................... 439/76.1; 439/931
(58) Field of Classification Search ............... 439/76.1, 439/55, 67, 77, 34, 906, 931; 361/748, 749
See application file for complete search history.

(56) References Cited

U.S. PATENT DOCUMENTS

| | | | |
|---|---|---|---|
| 6,932,623 B1* | 8/2005 | Lai ........................... | 439/76.1 |
| 6,932,649 B1* | 8/2005 | Rothermel et al. ......... | 439/620 |
| 6,984,132 B1* | 1/2006 | Spalding et al. ........... | 439/76.1 |
| 7,004,783 B1* | 2/2006 | Kumamoto et al. ........ | 439/470 |
| 7,008,240 B1* | 3/2006 | Wang et al. ................ | 439/76.1 |
| 7,018,218 B1* | 3/2006 | Asano et al. ............... | 439/76.2 |
| 7,052,287 B1* | 5/2006 | Ni et al. .................... | 439/76.1 |

* cited by examiner

*Primary Examiner*—Khiem Nguyen
(74) *Attorney, Agent, or Firm*—Morgan, Lewis & Bockius LLP

(57) ABSTRACT

When a first circuit unit and a second circuit unit are to be positioned and superposed by positioning portions and positioning portions, an exposed portion of a circuit conductor in the second circuit unit is deformed corresponding to a difference in a dimension between the positioning portions and the positioning portions. Consequently, a shift part caused by the difference in the dimension between the positioning portions and the positioning portions is automatically absorbed so that the first circuit unit and the second circuit unit can be assembled easily.

3 Claims, 4 Drawing Sheets

CIRCUIT UNIT DEVICE

BACKGROUND OF THE INVENTION

The present invention relates to a circuit unit device constituted by superposing a first circuit unit and a second circuit unit which are formed by assembling a circuit conductor having a contact portion and a terminal portion in an insulator respectively.

Conventionally, a switch device for a vehicle comprises a circuit unit device constituted by superposing a first circuit unit and a second circuit unit which are formed by assembling a circuit conductor having a contact portion and a terminal portion in an insulator respectively, for example. In such a case, the first circuit unit constitutes a main circuit, for example, and the second circuit unit constitutes an attached circuit. They are positioned, and particularly, positions of the contact portion and the terminal portion are set.

However, the first circuit unit and the second circuit unit are separate members and a dimension between portions to be positioned has a difference depending on a product. For this reason, there is a problem in that positions of the portions to be positioned each other are not adapted finely when they are assembled and an assembly is thus hard to perform.

SUMMARY OF THE INVENTION

The invention has been made in consideration of the circumstances, and therefore, has an object to provide a circuit unit device capable of easily assembling a first circuit unit and a second circuit unit which have a difference in a dimension between portions to be positioned depending on a product.

In order to solve the aforesaid object, the invention is characterized by having the following arrangement.

(1) A circuit unit device comprising:
a first circuit unit that includes a first insulator and a first circuit conductor assembled into the first insulator, the first circuit conductor including a first contact portion and a first terminal portion; and
a second circuit that is superposed on the first circuit unit and includes a second insulator and a second circuit conductor assembled into the second insulator, the second circuit including a second contact portion and a second terminal portion,
wherein a part of the second circuit conductor between the second contact portion and the second terminal portion is exposed and can be deformed.

(2) The circuit unit device according to (1), wherein the exposed part of the second circuit conductor is bent to form a step portion.

(3) The circuit unit device according to (1), wherein
the second insulator includes a first half insulator piece on which the second contact portion is arranged and a second half insulator piece on which the second terminal portion is arranged, and
the first insulator includes a positioning portion for positioning the first half insulator piece so that the first contact portion is positioned with respect to the second contact portion and a positioning portion for the positioning the second half insulator piece so that the first terminal portion is positioned with respect to the second terminal portion.

According to the means, when the first circuit unit and the second circuit unit are to be positioned and superposed, an exposed portion of the circuit conductor in the second circuit unit is deformed depending on a difference in a dimension between portions to be positioned. Consequently, a shift part made by the difference in the dimension between the portions to be positioned is absorbed automatically so that the assembly can easily be carried out.

DESCRIPTION OF THE REFERENCE NUMERALS AND SIGNS

Figure 1:
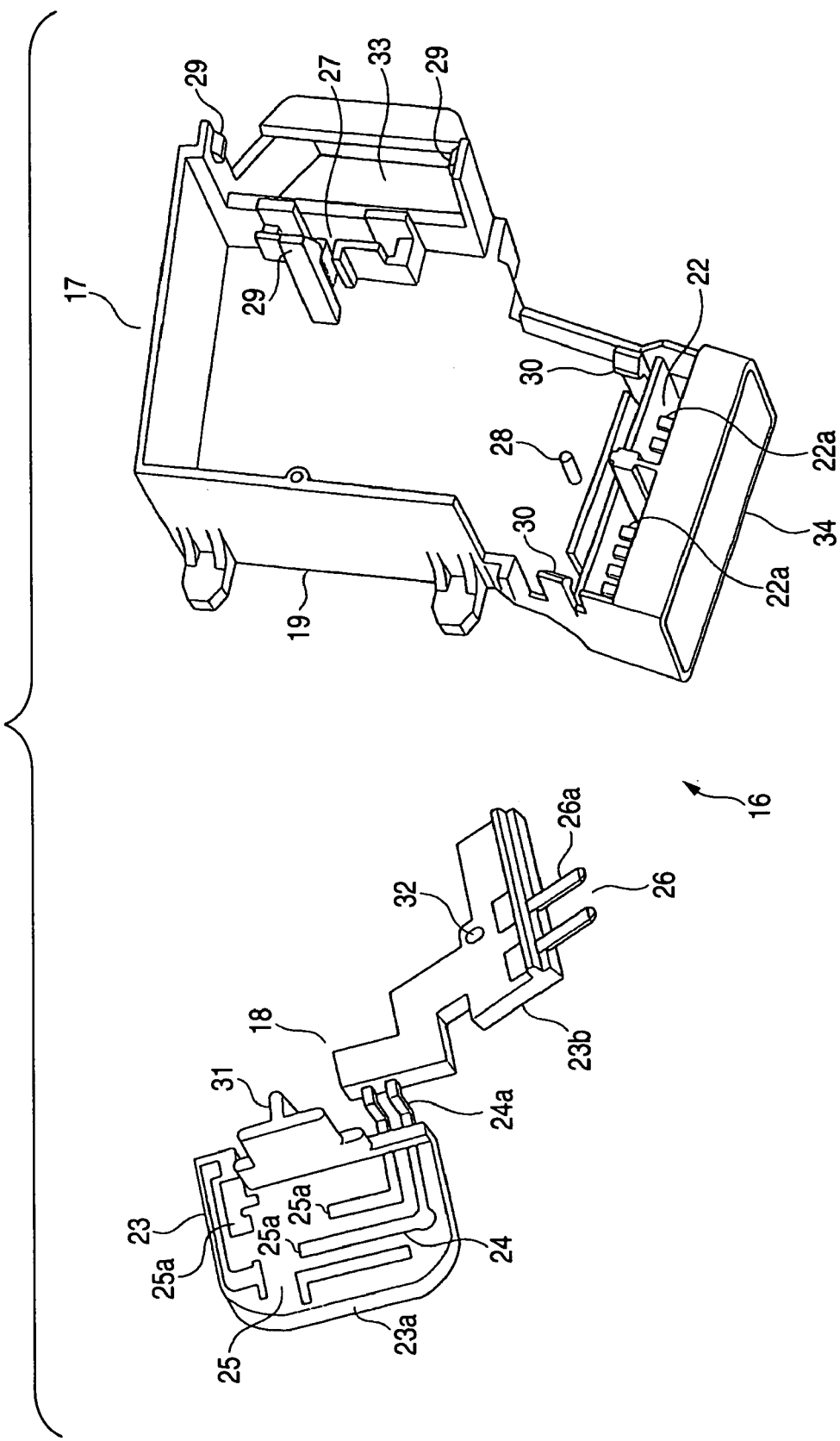
FIG. 1 is an exploded perspective view showing a circuit unit device according to an example of the invention.

In the drawings, 16 denotes a circuit unit device, 17 denotes a first circuit unit, 18 denotes a second circuit unit, 19 and 23 denote an insulator, 20 and 24 denote a circuit conductor, 24a denotes a part of the circuit conductor (an exposed portion), 21 and 25 denote a contact portion, 22 and 26 denote a terminal portion, and 27, 28, 31 and 32 denote a positioning portion.

DETAILED DESCRIPTION OF PREFERRED EMBODIMENTS

An embodiment of the invention will be described below with reference to the drawings.

Figure 3:
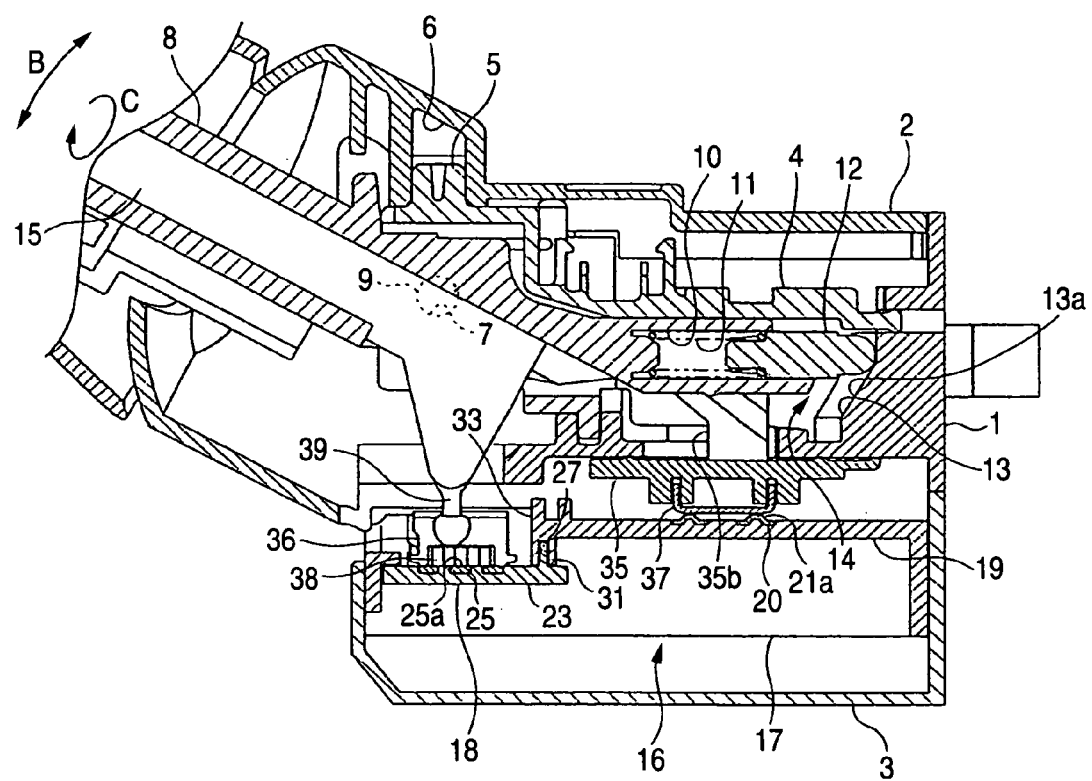
FIG. 3 is a sectional view showing a base portion of a lever switch device in a vehicle, which is taken away along an X—X line in FIG. 4.

First of all, FIG. 3 shows a base portion of a lever switch device for a vehicle, particularly, a car, and a body cover 2 is attached to a forward part thereof (an upper part in FIG. 3) by setting a body 1 to be a main member and an under cover 3 is attached to a rear part (a lower part in FIG. 3).

A bracket 4 to be an operation lever support is disposed between the body cover 2 and the body 1. In the bracket 4, surface portions other than a front surface portion and both upper and lower side surface portions (an orthogonal direction to the paper of FIG. 3) are opened and a cylindrical shaft portion 5 is formed on a left side part in the front surface portion, and the shaft portion 5 is fitted in a cylindrical concave portion 6 formed on the body cover 2 so that the bracket 4 is supported rotatably in an orthogonal direction to the paper of FIG. 3 around the shaft portion 5 (in a direction shown in an arrow A of FIG. 4).

Moreover, the both upper and lower side surface portions of the bracket 4 form cylindrical holes 7 (only the hole 7 on an upper side is shown). On the other hand, 8 denotes an operation lever, and a base portion of the operation lever 8 is inserted in the bracket 4. Furthermore, a cylindrical shaft portion 9 is formed on the base portion of the operation lever 8. The shaft portion 9 is fitted in the hole 7 of the bracket 4 so that the operation lever 8 is supported rotatably in a direction shown in an arrow B of FIG. 3 (an orthogonal direction to the paper of FIG. 4) around the shaft portion 9.

Figure 4:
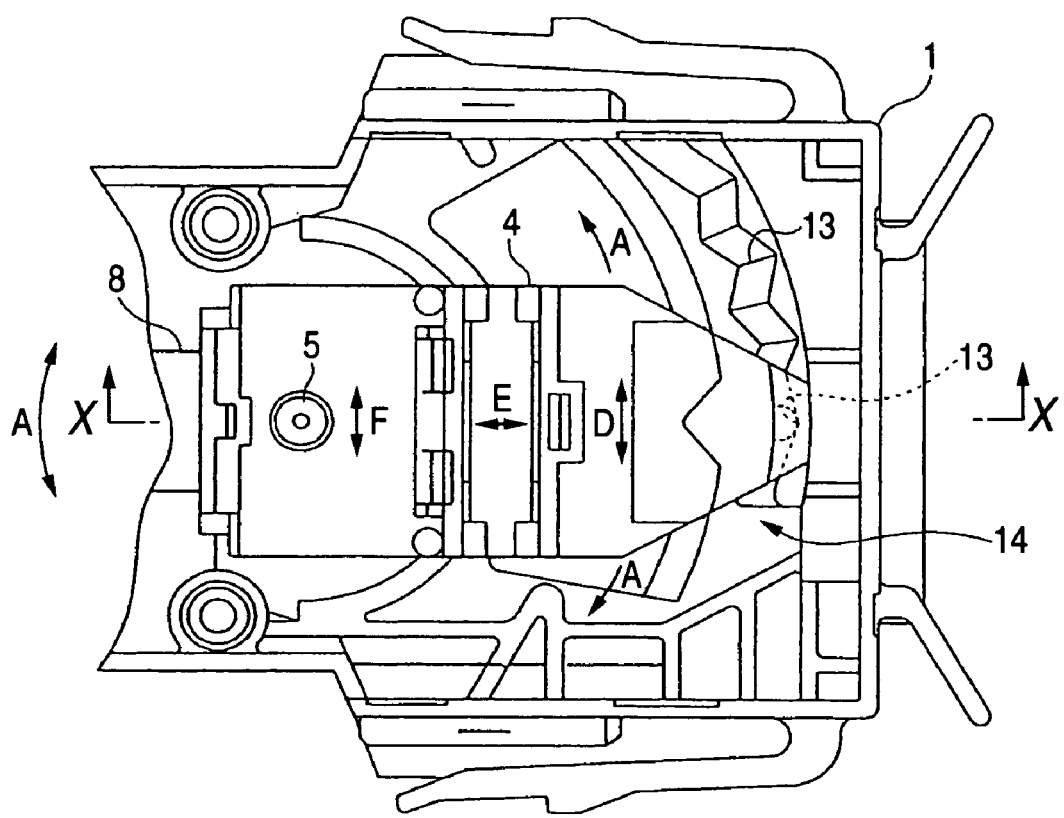
FIG. 4 is a front view showing a state in which a body cover in the lever switch device for the vehicle is removed.

In addition, a concave portion 10 shown in FIG. 3 is formed on the base portion of the operation lever 8, and a spring 11 and a moderation piece 12 are accommodated therein. On the other hand, a plurality of moderation valleys 13 having slant faces 13a in a longitudinal direction is arranged in a circular arc arrangement around the shaft portion 5 of the bracket 4 in the body 1 as shown in FIG. 4, and the moderation piece 12 is pressed in contact and is engaged with one of the moderation valleys 13 by an elastic force of the spring 11, and the moderation piece 12, the spring 11 and the moderation valley 13 constitute a moderation mechanism 14.

Furthermore, a shaft 15 is inserted in the operation lever 8 taking a hollow shape so as to be rotatable as shown in an arrow C of FIG. 3, and an operation knob is attached to a tip portion (not shown) of the shaft 15.

A circuit unit device 16 is provided in the under cover 3. In detail, the circuit unit device 16 is constituted by a first circuit unit 17 shown in FIGS. 1 and 2 and a second circuit unit 18. The first circuit unit 17 is constituted by assembling a circuit conductor 20 formed of copper shown in FIG. 2 into an insulator 19 formed of plastic, for example. The circuit conductor 20 includes a contact portion 21 having a plurality of contacts 21a on one of ends and a terminal portion 22 having a plurality of terminals 22a on the other end.

Moreover, the second circuit unit 18 is also constituted by assembling a circuit conductor 24 formed of copper into an insulator 23 formed of plastic, for example. The circuit conductor 24 includes a contact portion 25 having a plurality of contacts 25a on one of ends and includes a terminal portion 26 having a plurality of terminals 26a on the other end. In the second circuit unit 18, the insulator 23 is divided into a half insulator piece 23a on a contact portion side and a half insulator piece 23b on a terminal portion side to be separate members. Consequently, a part 24a of the circuit conductor 24 between the contact portion 25 and the terminal portion 26 is exposed and can be deformed. In addition, the exposed portion 24a of the circuit conductor 24 is bent upward to be L-shaped from the contact portion 25 side and is bent downward to be inverse L-shaped on the terminal portion 26 side as shown in FIG. 1 so that the terminal portion 26 side is bent to form a step portion that the terminal portion 26 side is higher than the contact portion 25 side.

In the first circuit unit 17, furthermore, a positioning portion 27 is formed on a back face at the contact portion 21 side of the insulator 19 and a positioning portion 28 is formed on the terminal portion 22 side. In this case, the positioning portion 27 is a T-shaped trench and the positioning portion 28 is a pin-shaped projection. In addition, engagement clicks 29 and 30 to be attachment portions are formed on the back faces at the contact portion 21 side and the terminal portion 22 side in the insulator 19 of the first circuit unit 17, respectively.

On the other hand, a positioning portion 31 is formed on a surface at the contact portion 25 side of the insulator 23 and a positioning portion 32 is formed at the terminal portion 26 side in the second circuit unit 18. In this case, the positioning portion 31 is a T-shaped projection to be fitted in the positioning portion 27 of the first circuit unit 17 and the positioning portion 32 is a hole to be fitted in the positioning portion 28 of the first circuit unit 17.

Figure 2:
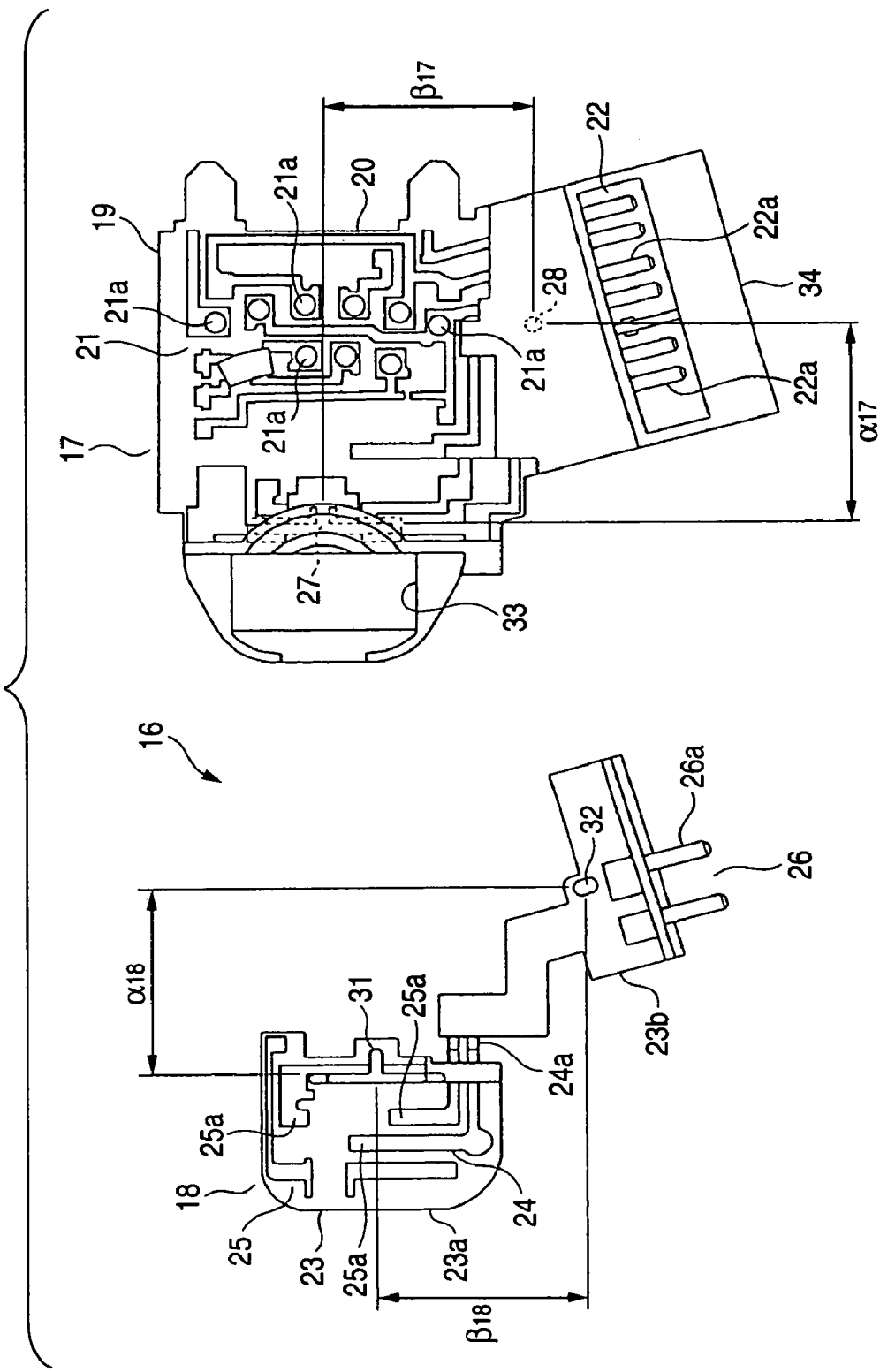
FIG. 2 is an exploded front view showing the circuit unit device.

In FIG. 2, a dimension between the positioning portions 27 and 28 of the first circuit unit 17 is indicated as $\alpha_{17}$ and $\beta_{17}$, and a dimension between the positioning portions 31 and 32 of the second circuit unit 18 is indicated as $\alpha_{18}$ and $\beta_{18}$.

With this structure, the positioning portion 31 of the second circuit unit 18 is fitted in the positioning portion 27 of the first circuit unit 17, and furthermore, the positioning portion 32 of the second circuit unit 18 is fitted in the positioning portion 28 of the first circuit unit 17, and at the same time, the insulator 23 of the second circuit unit 18, particularly, the half insulator piece 23a on the contact portion side is engaged with the engagement click 29 and the half insulator piece 23b on the terminal portion side is engaged with the engagement click 30 so that the second circuit unit 18 is superposed on and coupled to the first circuit unit 17.

In the superposing and coupling state, the contact portion 25 of the second circuit unit 18 faces a forward part (an upper part in FIG. 3) from an opening portion 33 formed on the insulator 19 in the first circuit unit 17 and the terminal portion 26 faces an outside part together with the terminal portion 22 of the first circuit unit 17 from a frame portion 34 formed on the insulator 19.

Contact holders 35 and 36 are disposed in a forward part (an upper part in FIG. 3) of the circuit unit device 16 provided in the under cover 3. The contact holders 35 and 36 have movable contacts 37 and 38 attached individually to the circuit unit device 16 side respectively, and the movable contact 37 slides over the insulator 19 of the first circuit unit 17 to approach or separate from the contact 21a and the movable contact 38 slides over the insulator 23 of the second circuit unit 18 to approach or separate from the contact 25a.

In addition, the contact holder 35 has an arm portion 35b and is engaged with the bracket 4 at the arm portion 35b. Moreover, an arm portion 39 is protruded from a base end of the shaft 15 and a tip portion of the arm portion 39 is engaged with the contact holder 36 through the opening portion 33 of the first circuit unit 17.

Furthermore, a connector (not shown) inserted through the frame portion 34 of the first circuit unit 17 is connected to the terminal portion 22 of the first circuit unit 17 and the terminal portion 26 of the second circuit unit 18 and is thus conducted.

When a user operates the operation lever 8 in the direction shown in the arrow A of FIG. 4, the bracket 4 is rotated in the same direction around the shaft portion 5 correspondingly. When the bracket 4 is rotated in such a way, the moderation piece 12 is engaged with the moderation valley 13 which is adjacent thereto in the moderation mechanism 14 to give a moderation to the rotation of the bracket 4 and the operation lever 8. At the same time, the contact holder 35 to be interlocked with the rotation of the bracket 4 through the arm portion 35b slides over the insulator 19 of the first circuit unit 17 in a direction shown in an arrow D of FIG. 4 together with the movable contact 37 so that the movable contact 27 is caused to approach or separate from the contact 21a of the circuit conductor 20. At this time, the approach/separation of the movable contact 37 to/from the contact 21a is used for switching a speed of a front wiper of a vehicle, for example.

On the other hand, when the operation lever 8 is operated in a direction shown in the arrow B of FIG. 3, the operation lever 8 is rotated in the same direction around the shaft portion 9. At the same time, the contact holder 35 to be interlocked with the rotation of the bracket 4 through the arm portion 35b slides over the insulator 19 of the first circuit unit 17 in a direction shown in an arrow E of FIG. 4 together with the movable contact 37 so that the movable contact 37 is caused to approach or separate from the contact 21a of the circuit conductor 20. At this time, the approach/separation of the movable contact 37 to/from the contact 21a is used for switching an operation of a front washer of a vehicle.

When an operation knob (not shown) attached to the tip portion of the shaft 15 is rotated, the shaft 15 is rotated in the direction shown in the arrow C of FIG. 3 so that the contact holder 36 slides over the insulator 23 of the second circuit unit 18 in a direction shown in an arrow F of FIG. 4 together with the movable contact 38 to cause the movable contact 38 to approach or separate from the contact 25a of the circuit conductor 24. The approach/separation of the movable contact 38 to/from the contact 25a is used for switching an operation of a rear wiper of a vehicle.

In the foregoing, the switching of the operation of the rear wiper in the vehicle through the second circuit unit 18 is a function provided depending on a grade of the vehicle, for example. Vehicles having different grades do not have the switching function but a function of switching a speed of a front wiper through the first circuit unit 17 and a function of switching an operation of the front washer. More specifically, as described above, the first circuit unit 17 constitutes the main circuit, while the second circuit unit 18 constitutes the attached circuit. Thus, they are selective. If necessary, the second circuit unit 18 is superposed coupled to the first circuit unit 17.

Referring to the superposing/coupling of the second circuit unit 18 on/to the first circuit unit 17, thus, the part 24a of the circuit conductor 24 between the contact portion 25 and the terminal portion 26 in the second circuit unit 18 is exposed and can be deformed in this structure. When the second circuit unit 18 is to be positioned and superposed on the first circuit unit 17, consequently, the exposed portion 24a of the circuit conductor 24 in the second circuit unit 18 is deformed corresponding to a difference in a dimension (the dimensions $\alpha_{18}$, $\beta_{18}$ between the positioning portions 31 and 32 of the second circuit unit 18 and the dimensions $\alpha_{17}$, $\beta_{17}$ between the positioning portions 27 and 28 of the first circuit unit 17) also in such a situation that the mutual positions of the portions to be set are not finely adapted depending on a difference between the dimensions. Consequently, a shift part made by the difference in the dimension between the portions to be positioned is automatically absorbed so that the second circuit unit 18 can easily be assembled into the first circuit unit 17 without difficulty differently from the conventional art.

With this structure, particularly, the exposed portion 24a of the circuit conductor 24 in the second circuit unit 18 is bent to form a step portion. Consequently, the exposed portion 24a is deformed longitudinally, transversely and vertically. By their combinatorial deformation, consequently, an absorption of the shift part caused by the difference in the dimension between the portions to be positioned in the first circuit unit 17 and the second circuit unit 18 can be enhanced so that the second circuit unit 18 can be assembled into the first circuit unit 17 further easily.

The invention is not restricted to the example described above and shown in the drawings, particularly, to a circuit unit device for a vehicle as a whole but can be properly changed and executed without departing from the scope thereof.

What is claimed is:

1. A circuit unit device comprising:
   a first circuit unit that includes a first insulator and a first circuit conductor assembled into the first insulator, the first circuit conductor including a first contact portion and a first terminal portion; and
   a second circuit that is superposed on the first circuit unit and includes a second insulator and a second circuit conductor assembled into the second insulator, the second circuit including a second contact portion and a second terminal portion,
   wherein a part of the second circuit conductor between the second contact portion and the second terminal portion is exposed and can be deformed.

2. The circuit unit device according to claim 1, wherein the exposed part of the second circuit conductor is bent to form a step portion.

3. The circuit unit device according to claim 1, wherein the second insulator includes a first half insulator piece on which the second contact portion is arranged and a second half insulator piece on which the second terminal portion is arranged, and
   the first insulator includes a positioning portion for positioning the first half insulator piece so that the first contact portion is positioned with respect to the second contact portion and a positioning portion for the positioning the second half insulator piece so that the first terminal portion is positioned with respect to the second terminal portion.

* * * * *